(12) United States Patent
Orsat

(10) Patent No.: US 8,320,294 B2
(45) Date of Patent: Nov. 27, 2012

(54) METHOD FOR COMMUNICATING IN A NETWORK COMPRISING WIRE AND WIRELESS NODES

(75) Inventor: Jean-Michel Orsat, Chatillon-sur-Cluses (FR)

(73) Assignee: Somfy SAS, Cluses (FR)

( * ) Notice: Subject to any disclaimer, the term of this patent is extended or adjusted under 35 U.S.C. 154(b) by 1423 days.

(21) Appl. No.: 11/666,253

(22) PCT Filed: Oct. 24, 2005

(86) PCT No.: PCT/IB2005/003161
§ 371 (c)(1),
(2), (4) Date: Apr. 25, 2007

(87) PCT Pub. No.: WO2006/046104
PCT Pub. Date: May 4, 2006

(65) Prior Publication Data
US 2008/0089266 A1    Apr. 17, 2008

(30) Foreign Application Priority Data

Oct. 26, 2004  (FR) ..................................... 04 11401

(51) Int. Cl.
*H04B 7/14* (2006.01)
(52) U.S. Cl. ........ 370/315; 370/293; 370/501; 370/316; 370/227; 370/228; 370/229; 370/230; 370/329; 379/238; 340/12.1; 340/12.22; 340/12.3; 340/12.31; 340/12.32; 340/12.5; 340/538.9; 340/9.11

(58) Field of Classification Search ................... 370/501, 370/215, 227–329; 379/238; 340/12.1, 12.22, 340/12.3, 12.31, 12.32, 12.5, 538, 9.11
See application file for complete search history.

(56) References Cited

U.S. PATENT DOCUMENTS

| | | | |
|---|---|---|---|
| 4,912,461 A | | 3/1990 | Cenzano, Jr. et al. |
| 5,809,220 A | * | 9/1998 | Morrison et al. ................ 714/12 |
| 5,875,179 A | | 2/1999 | Tikalsky |
| 5,905,442 A | | 5/1999 | Mosebrook et al. |
| 6,233,228 B1 | * | 5/2001 | Collar et al. ................... 370/315 |
| 6,690,276 B1 | | 2/2004 | Marino |
| 6,856,236 B2 | | 2/2005 | Christensen et al. |
| 6,879,806 B2 | | 4/2005 | Shorty |
| 6,973,067 B1 | * | 12/2005 | Haartsen ....................... 370/337 |

(Continued)

FOREIGN PATENT DOCUMENTS

JP    2001-156804    6/2001
(Continued)

*Primary Examiner* — Olumide T Ajibade Akonai
*Assistant Examiner* — Edward Zhang
(74) *Attorney, Agent, or Firm* — Frommer Lawrence & Haug LLP; Ronald R Santucci

(57) ABSTRACT

The inventive method makes it possible to communicate in a network comprising wireless nodes provided with communications means enabling to communicate through a wireless channel and wire nodes provided with communication means enabling to communicate through a wire channel. Said method is characterised in that the wire node repeats a message received exclusively through a wireless channel if a signal acknowledging the message reception is not received, wherein the transmission of said acknowledgement signal is generated in a first time slot upon the reception of the signal though a wire channel.

16 Claims, 7 Drawing Sheets

U.S. PATENT DOCUMENTS

| | | |
|---|---|---|
| 6,980,080 B2 | 12/2005 | Christensen et al. |
| 2002/0080774 A1* | 6/2002 | Griffith et al. ............... 370/352 |
| 2002/0089994 A1* | 7/2002 | Leach et al. .................. 370/412 |
| 2003/0069018 A1* | 4/2003 | Matta et al. .................. 455/436 |
| 2003/0109270 A1* | 6/2003 | Shorty ........................ 455/517 |
| 2004/0110483 A1* | 6/2004 | Mollenkopf .................. 455/402 |
| 2004/0157548 A1 | 8/2004 | Eyer |
| 2004/0205071 A1* | 10/2004 | Uesugi et al. ................ 707/100 |

FOREIGN PATENT DOCUMENTS

| | | |
|---|---|---|
| JP | 2003-134030 | 5/2003 |
| JP | 2004-260337 A | 9/2004 |
| WO | WO 01/59995 | 8/2001 |
| WO | WO 01/59995 A1 * | 8/2001 |
| WO | WO 01/78307 | 10/2001 |
| WO | WO 02/098060 | 12/2002 |

* cited by examiner

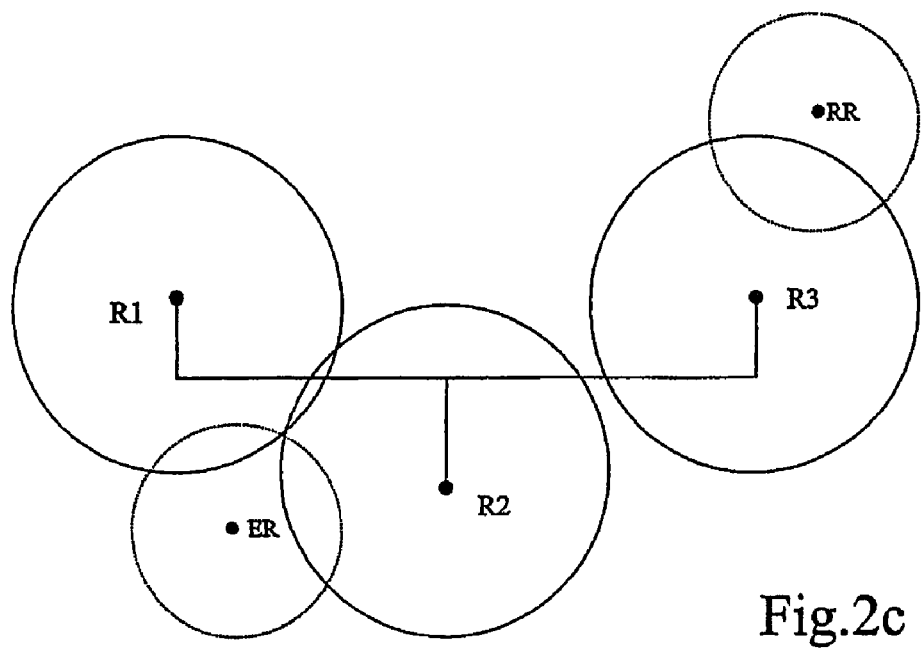
Fig.2c
Fig.3
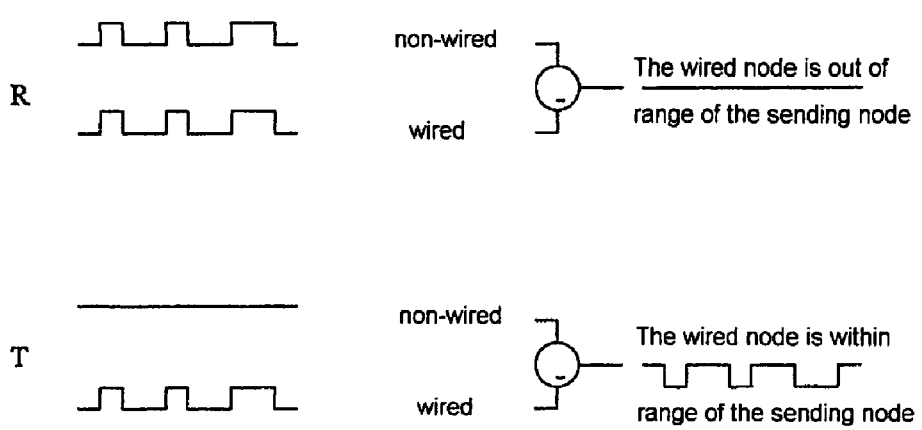

METHOD FOR COMMUNICATING IN A NETWORK COMPRISING WIRE AND WIRELESS NODES

This application is a 371 of PCT/IB2005/003161 filed on Oct. 24, 2005, published on May 4, 2006 under publication number WO 2006/046104 A1 which claims priority benefits from French Patent Application No. 04/11401 filed Oct. 26, 2004, the disclosure of which is incorporated herein by reference.

BACKGROUND OF THE INVENTION

The invention relates to a method of communication in a network comprising so-called non-wired nodes provided with communication means enabling communication by non-wired channel and so-called wired nodes provided with communication means enabling communication by wired channel and by non-wired channel. It also relates to a network for implementing this method.

Having the various elements of a home automation or building automation network communicate via wireless links by radiofrequency waves or by infrared waves is known. The use of such wireless communication links is recognized for the flexibility and ease of installation that it provides. However, the range of such links can be limited, particularly in the case of transmissions through partitions, walls or ceilings.

In the case of installations where such problems arise, the use of repeater elements is routine, so as to ensure the transmission of information between the various elements of the network despite the presence of obstacles. However, the installations provided with repeaters have drawbacks such as the increased information transmission delays and the spectrum usage time.

Another solution involves using a supplementary cable network to route the information from one room of the building to another. The range of the wireless links needed is then limited to the distance between the elements communicating only via wireless links and the nearest element linked to the cable network.

The main characteristic of the known installations using repeater elements is to provide and transmit, at the same time as control information for an equipment item in the building, a certain number of information items needed to route the data.

Patent application WO 01/78307 describes a home automation network in which any controlled equipment item can become a repeater. Thus, an equipment item can receive signals transmitted by different routes using the existing controlled equipment items. In this network, routing tables are duplicated from one repeater equipment item to another in an adjustment mode. In this way, it is possible, for each equipment item, to initialize a routing table, enabling it to receive information and retransmit it to another equipment item by radio link.

Along the same lines, patent application WO 02/098060 describes a method of identification, by an element, of the various elements of the network that surround it, by constructing a table of identifiers that can be recipients of a message.

A method of dynamically determining the length of the path traveled by a message, so as to optimize the communication times by favoring short paths, is known from U.S. Pat. No. 5,875,179.

In the field of access control by reading magnetic cards, a communication network comprising repeater elements operating on the principle of routing and means for modifying the routing signal if return information from a recipient element to which a message is transmitted is not received within a given time, is known from U.S. Pat. No. 4,912,461.

Finally, from U.S. Pat. No. 5,905,442, a system in which the elements can communicate by different types of link is known. Claim 105 defines a transmission mode wherein a state modification control instruction is transmitted via a wired communication link and wherein the return information is transmitted via a wireless communication link.

Similarly, systems managing the interactions between wired and non-wired communications are described in the Japanese patent applications JP 2003-134030 and JP 2001-156804.

Application JP 2003-134030 describes in particular a cable network, to which is added a radio function and a wire/radio protocol conversion function to add flexibility to the system. The redundancy of the communication paths is, in this patent application, one means of increasing the reliability of the system.

Application JP 2001-156804 also describes a system wherein the nodes of the cable network can act as repeaters to transmit a communication between two non-wired nodes.

None of these documents provide for a measurement for checking that each receiving node receives the transmitted message only once, possibly by different paths.

On the contrary, to provide a good transmission reliability, favoring a systematic reproduction of the signals transmitted over supplementary (cable) networks is routine. Such is the case for example in document JP 2003-134030. Because of this, it is possible for certain controls to be received and interpreted several times, which poses problems in the case of sequential controls for example. Furthermore, the system can experience spectrum management and occupancy problems.

A somewhat similar problem can be found in U.S. Pat. No. 6,690,276. In this patent, the aim is to monitor the data transmitted over a communication bus between a central processing unit and receivers. When a receiver receives a message from a wireless transmitter, it translates it into a digital signal and transmits it to the control unit. The latter, on receipt, sends a confirmation message. A second receiver receiving a message from a transmitter places it in a memory. It then listens for a confirmation message, if any. If it receives one, it checks whether the first message is identical to that which it has in memory. If it is, the memory is erased; otherwise, the second message is transmitted to the control unit. This U.S. Pat. No. 6,690,276 therefore proposes a solution to avoid the duplicated transmission of one and the same message from different sources to one central unit over a wired bus, so as to avoid unnecessary signal traffic on the cable network. It therefore does not provide any response in the context of a system in which repeater elements need to be sure of routing a message just once when there is a plurality of different paths (wired or non-wired) to a receiving node.

SUMMARY OF THE INVENTION

The aim of the invention is to provide a communication method that improves the known communication methods and overcomes the abovementioned drawbacks. In particular, the invention proposes a communication method that makes it possible to manage the wired communication links and the non-wired communication links to respond to the problems raised by the distances between the different elements and the ranges of these elements. In particular, the method according to the invention makes it possible to determine when and how to use the supplementary cable networks for optimal transmission of information and control instructions, without necessarily involving a heavy construction of area identifier tables or routing tables.

The method of communication according to the invention is characterized in that a wired node repeats by non-wired channel a message received exclusively by wired channel if it does not receive a message receipt confirmation signal, the transmission of this confirmation signal beginning in a first time slot after the receipt of the message by wired channel.

The dependent claims 2 to 12 define various embodiments of the communication method.

The network according to the invention comprises so-called non-wired nodes provided with communication means enabling communication by non-wired channel and so-called wired nodes provided with communication means enabling communication by wired channel and by non-wired channel. It is characterized in that it comprises hardware and software means for implementing the communication method defined previously.

At least the wired nodes can include memories for storing communication routing information in particular.

BRIEF DESCRIPTION OF THE DRAWINGS

The appended drawing represents, by way of examples, various procedures of an embodiment of the communication method according to the invention and an embodiment of a home automation network that can be used to implement the method.

FIGS. 2a to 2c are explanatory diagrams of various communication procedures that can occur according to the position of the sending and receiving nodes in the network.

FIG. 3 is a diagram explaining the principle of comparing the signals received by a wired node.

A communication network for implementing the communication method according to the invention comprises nodes sending and receiving bidirectional instructions having means of communication by non-wired channel. It links different home automation or building automation equipment items, for example lighting equipment, motorized closure, darkening or solar protection equipment, heating and/or ventilation equipment and control devices for such equipment. Some of the nodes of this network are also linked by a data transmission bus.

The purpose of the communication bus is to transmit, for example from one room of a building to another, messages by wired channel, if communication by non-wired channel between nodes is not possible or poor because of excessive distance or the presence of elements forming obstacles.

It is possible, for example, to have a wired node in each room of the building, so as to be sure of reaching all the nodes that have only means of non-wired communication via at least one wired node. The wired nodes then constitute message repeaters. They can, if necessary, in turn consist of controllable home automation equipment items.

The various nodes share one and the same communication protocol enabling non-wired messages to be converted into wired messages and vice-versa.

In the case where two different protocols (for example two non-wired communication protocols are used in two home automation systems of one and the same building) might need to coexist, the operation of the method that will be described in detail below remains valid. However, the non-wired messages must, if necessary, be converted.

Figure 1:
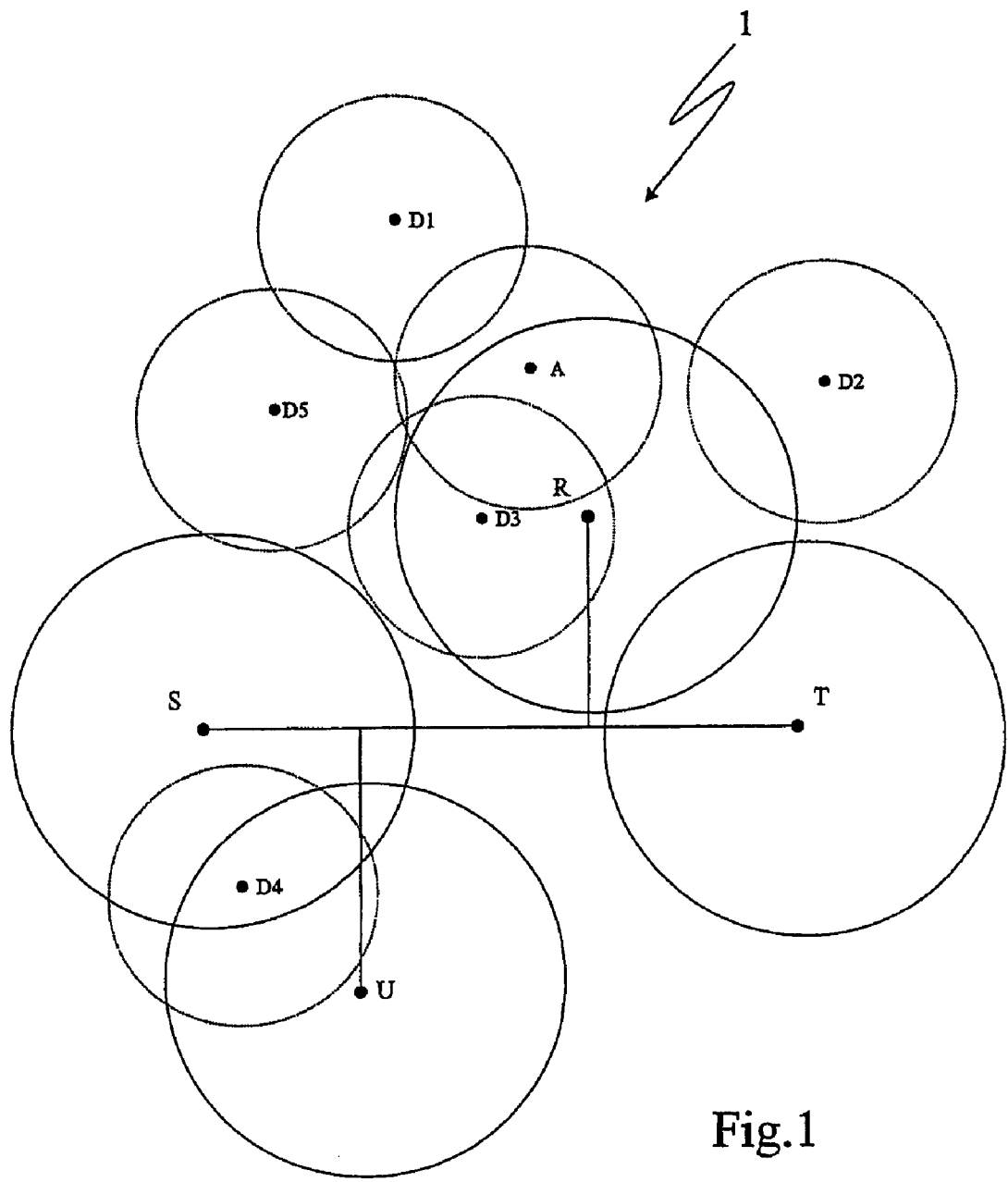
FIG. 1 is a diagram of an embodiment of a network according to the invention.

One embodiment of a network (1) for implementing the communication method according to the invention is represented in FIG. 1.

Figure 5:
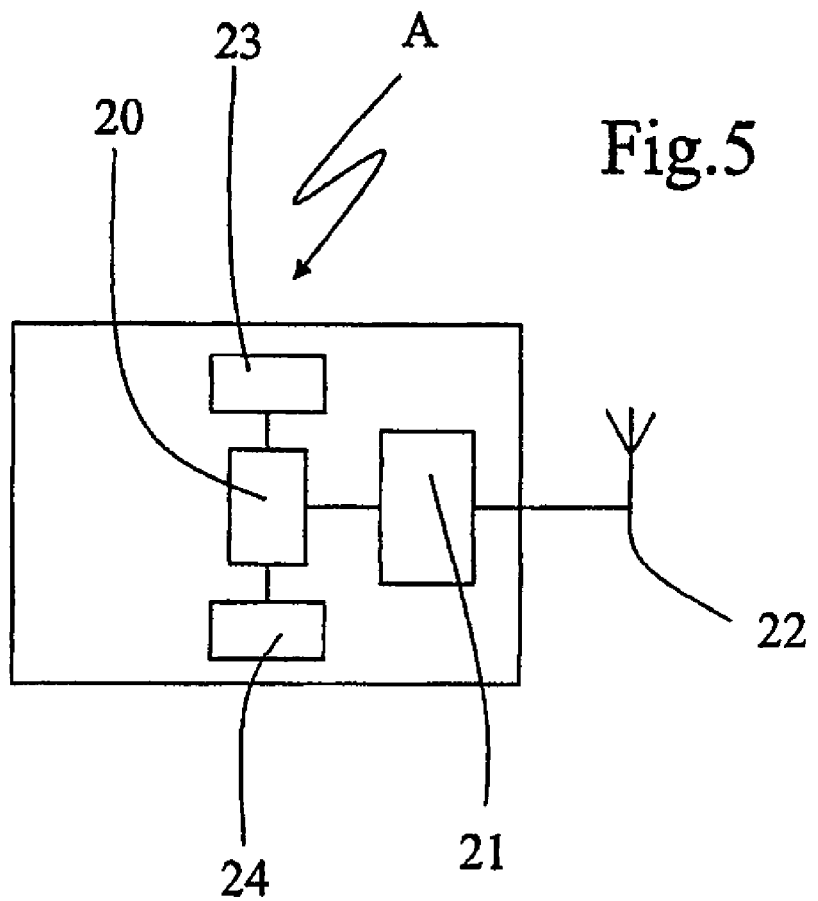
FIG. 5 is a diagram of a wired node.

In this network, node A is the node sending information and nodes D1 to D5 and D8 are receiving nodes with which the node A wants to communicate in turn. The nodes D1 to D5 and D8 comprise, like the node A represented in FIG. 5, a logic processing unit 20 linked to a memory 23, to non-wired communication means 21, 22 and, where necessary, to means 24 of controlling an electrical equipment item. The wireless communication means comprise, for example, an antenna 22 and a radiofrequency wave transmitter-receiver 21 in the case where this communication is handled by radiofrequency waves. These nodes are called non-wired nodes. They can also communicate using infrared signals.

Figure 6:
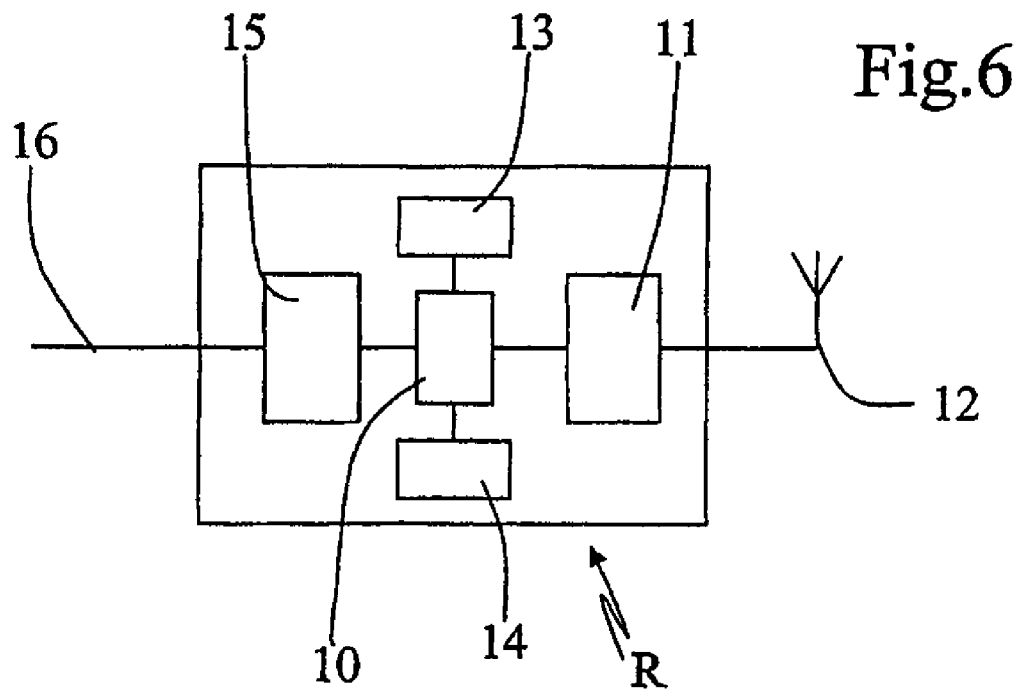
FIG. 6 is a diagram of a non-wired node.

The nodes R, S, T and U are wired nodes. Like the node R represented in FIG. 6, they comprise a logic processing unit 10 linked to a memory 13, to non-wired communication means 11, 12, to wired communication means 15, 16 and, where appropriate, to means 14 of controlling an electrical equipment item. The non-wired communication means comprise, for example, an antenna 12 and a radiofrequency wave transmitter-receiver 11 in the case where such communication is handled by radiofrequency waves. The wired communication means comprise, for example, a wired link 16 such as a link to a bus and signal modulation-demodulation means 15.

In order to simplify the representation, the nodes represented in the figures are ringed by circles that symbolize overall on the one hand the transmission range and on the other hand the reception sensitivity. When two circles intersect, it is assumed that the nodes corresponding to these circles can intercommunicate.

In the examples described, the wired nodes are only intended to repeat the messages. It is therefore not necessary for them to know the identifiers of the non-wired nodes. The wired nodes simply repeat the messages to route them to a receiving node, which, in turn, is paired with the sending node.

In the case of construction of routing tables as communications progress, the repeater nodes can store in memory the identifiers of the non-wired nodes that they detect as being within range, so as to construct these tables.

The wired nodes systematically and instantaneously repeat the messages received or transmitted by non-wired channel. Thus, all the wired nodes know the messages received or transmitted by one of them or by a non-wired node.

All the nodes can share the same key, for example a common network identifier (house key) or an encryption key.

The repeater nodes could also be sending nodes or receiving nodes. The protocol described, making it possible to avoid a duplicated transmission of the same control message to a receiving node, remains applicable in this case.

Conversely, the non-wired nodes are intended to be of sending or receiving type but not of repeater type. However, the case of repeater type non-wired nodes could be envisaged, even if the tendency is to avoid having too many information transmission repetitions via non-wired links, for example radiofrequency links, in order to satisfy the standards, particularly the European standards.

The sending node A is, for example, a radio remote control and the receiving nodes D1 to D5, receivers of instructions linked to actuators or to electrical equipment items of a building.

It is possible to consider that a wired node, for example the node T, and a non-wired node, for example D8, are combined in one and the same location, for example in the same housing. The wired node T then knows the position of the non-wired node D8. A message from the sending node A received by the cable network will be received by the wired node T and retransmitted directly to the non-wired node D8. Similarly, a confirmation signal from the non-wired node D8 is not necessarily sent conventionally but transmitted directly to the wired node T in order to be routed to the sending node A.

Various information routings are described with reference to FIG. 1 representing the locations of the various nodes relative to each other.

Case Where the Non-Wired Node D1 is the Receiving Node:

The non-wired node D1 can be reached only by the sending node A and not by one of the wired nodes which are out of range. The sending node A sends a message, and the non-wired nodes D1, D3 and D5 and the wired node R, being within range of the node A, receive this message. The non-wired node D1 sends to the sending node A a confirmation message, that none of the wired nodes can receive.

The sending node A receives a confirmation message. The wired node R retransmits over the wired network the message received from the sending node A to the other nodes of the network. The wired nodes T, S and U receive the message by wired channel, but do not receive it by non-wired channel. The wired nodes T, S and U then try, each in their turn, to send the message to the receiving non-wired node D1, without success, the latter being out of range. The wired node R finally tries to send the message to the receiving non-wired node D1, without success, the latter being out of range. When all the wired nodes have sent the message, the communication is ended. The receiving node D1 has indeed received the message, just once. The sending node A can also, on receiving the confirmation signal sent by the receiving node D1, retransmit it to the wired nodes in order to terminate the communication.

(This message routing should not occur, in as much as the ranges of the wired nodes are relatively great to cover one or more rooms of a building).

Case Where the Non-Wired Node D2 is the Receiving Node:

The receiving node D2 is out of range of the sending node A, but is within range of the wired node R. The sending node A sends a message and the non-wired nodes D1, D3 and D5 and the wired node R, being within range, receive it. Since nodes D1, D3 and D5 are not recipients, they do not take the message into consideration. The wired node R retransmits the message over the wired network. The wired nodes T, S and U receive the message by wired channel, but do not receive it by non-wired channel. One of the wired nodes that has not received the message by non-wired channel from the node A takes its turn to speak, for example the node T, followed by the nodes U, S, R. The receiving node D2 receives the message retransmitted by the wired node R and the latter returns a confirmation signal to the sending node A. The wired node R retransmits the confirmation signal over the wired network and by non-wired channel to A.

This is a very particular communication case which should occur only very rarely given the ranges and reception sensitivity, whether in the wired network or the non-wired network. The latter have deliberately been represented scaled down for comprehension.

Case Where the Non-Wired Node D3 is the Receiving Node:

The receiving node D3 is within range of the sending node A and the wired node R. The sending node A sends a message and the non-wired nodes D1, D3 and D5 and the wired node R, being within range, receive it. The nodes D1 and D5, not being recipients, do not take the message into consideration. The wired node R retransmits the message over the wired network. All the wired nodes listen for any confirmation message. Since the node D3 is the recipient, it sends a confirmation message to the sending node A. The wired node R also receives the confirmation signal and retransmits it over the wired network. This retransmission terminates the communication.

Case Where the Non-Wired Node D4 is the Receiving Node:

The receiving node D4 is within range of the wired nodes S and U. The sending node A sends a message and the non-wired nodes D1, D3 and D5 and the wired node R, being within range, receive it. Since the nodes D1, D3 and D5 are not recipients, they do not take the message into consideration. The wired node R retransmits the message over the wired network. The wired nodes T, S and U receive a message by wired channel, but do not receive it by non-wired channel. One of the wired nodes that has not received the message by non-wired channel from the node A takes its turn to speak, for example the node T, in order to send the message to the receiving node. Since no confirmation signal is received by a wired node, another node takes its turn to speak, for example the wired node U. The receiving node D4 receives the message repeated by the wired node U and returns to the node U a confirmation signal to the sending node A. The wired node U retransmits the confirmation signal over the wired network. The wired node R receives the message by the wired network and retransmits it by non-wired channel to the sending node A. The retransmission of the confirmation signal over the wired network terminates the communication.

Case Where the Non-Wired Node D5 is the Receiving Node:

The receiving node D5 and the wired node R are within range of the sending node A. The sending node A sends a message and the non-wired nodes D1, D3 and D5 and the wired node R, being within range, receive it. Since the nodes D1 and D3 are not recipients, they do not take the message into consideration. The wired node R retransmits the message over the wired network. The wired nodes T, S and U receive the message by wired channel, but do not receive it by non-wired channel. They listen for any confirmation signal. The receiving node D7, which has received the message directly from the sending node A, sends a confirmation signal. The wired node S also receives the confirmation signal from the node D5 and retransmits it over the wired network to the sending node A. The wired node R receives the confirmation signal sent by the sending node D5 via the wired node S to the sending node A. The wired node R deduces from it that the sending node A and the receiving node D5 have communicated directly.

In these examples, the wired node that receives a message by a non-wired channel and retransmits it by wired channel knows that it is the initiator of the control retransmission and therefore that it must retransmit by non-wired channel any confirmation signal that it receives by wired channel (or by non-wired channel: case of D2).

Figure 2A:
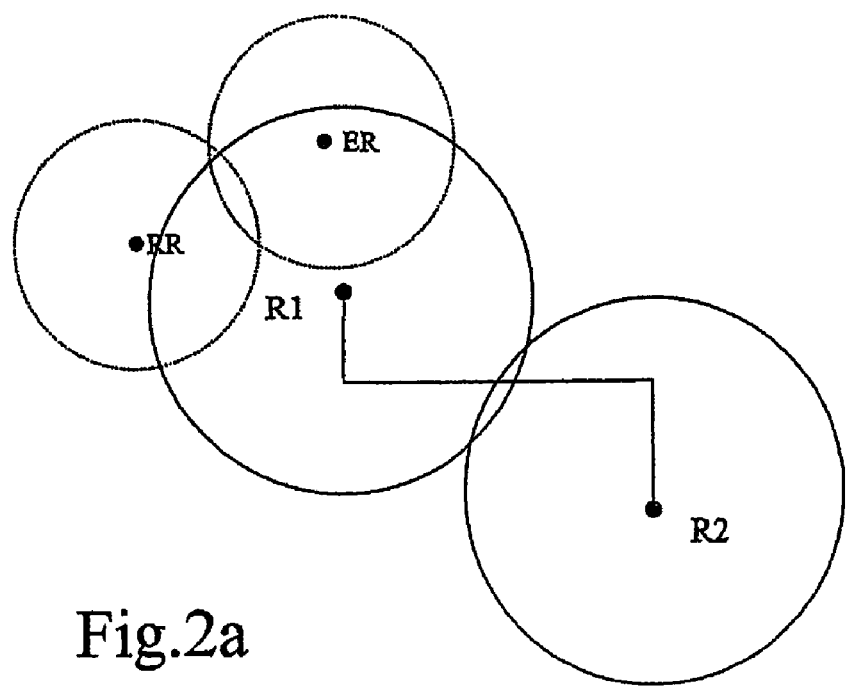
Figure 2B:
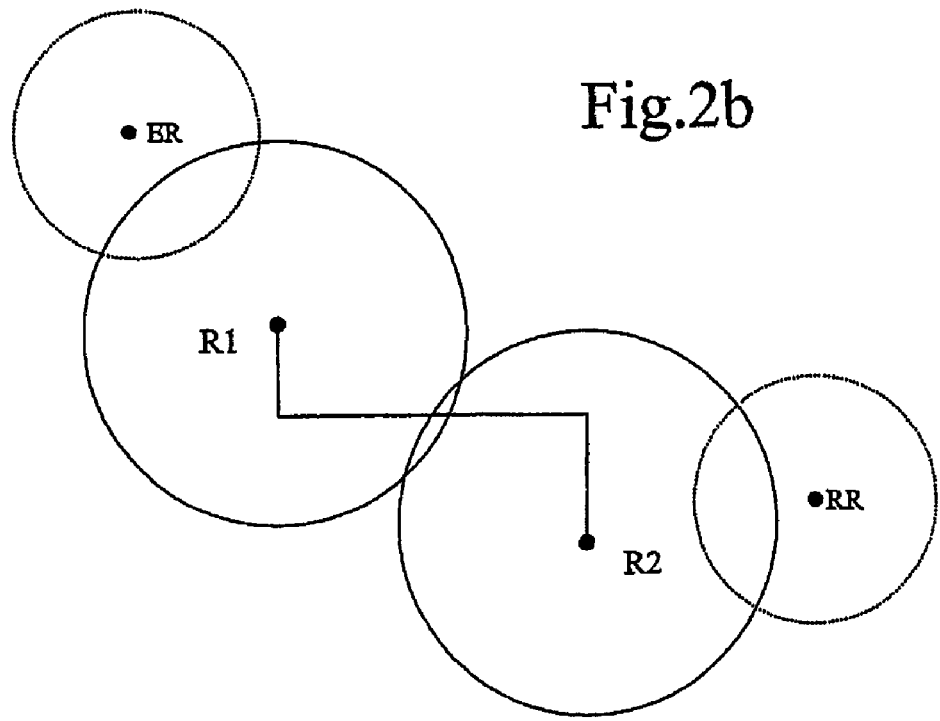
Figure 4A:
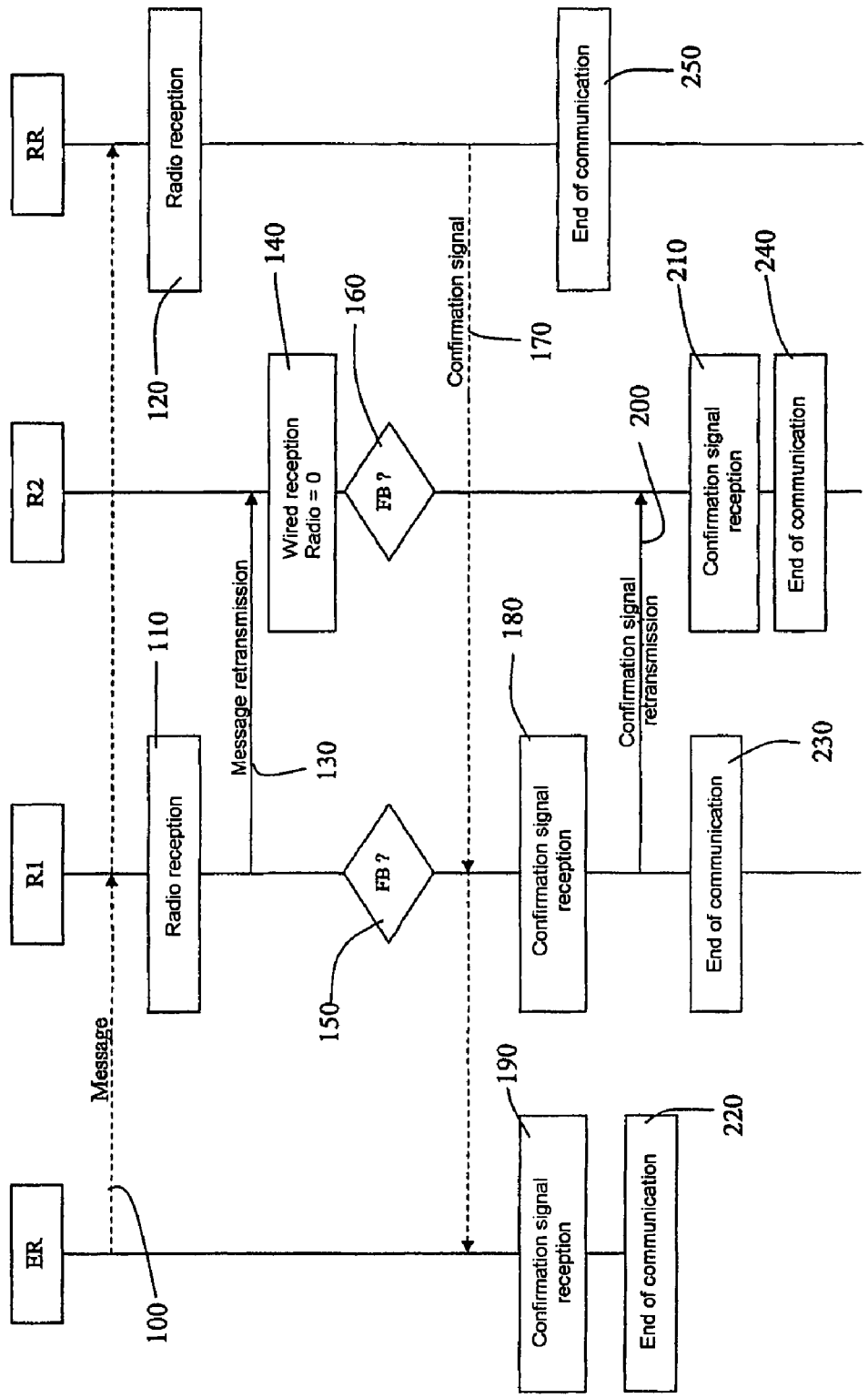
FIGS. 4a to 4c are flow diagrams explaining the various communication procedures that can occur according to the position of the sending and receiving nodes in the network.
Figure 4B:
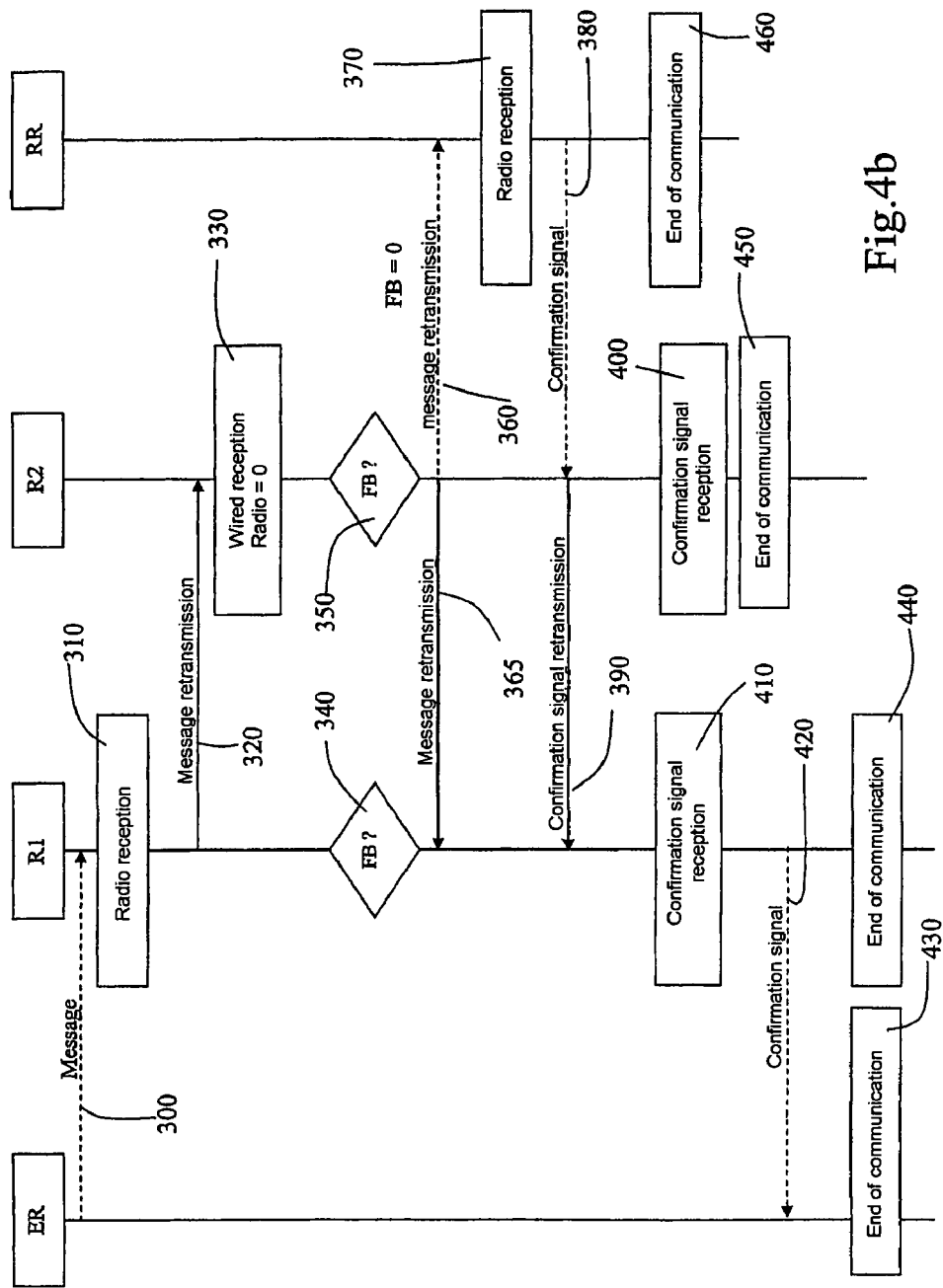
Figure 4C:
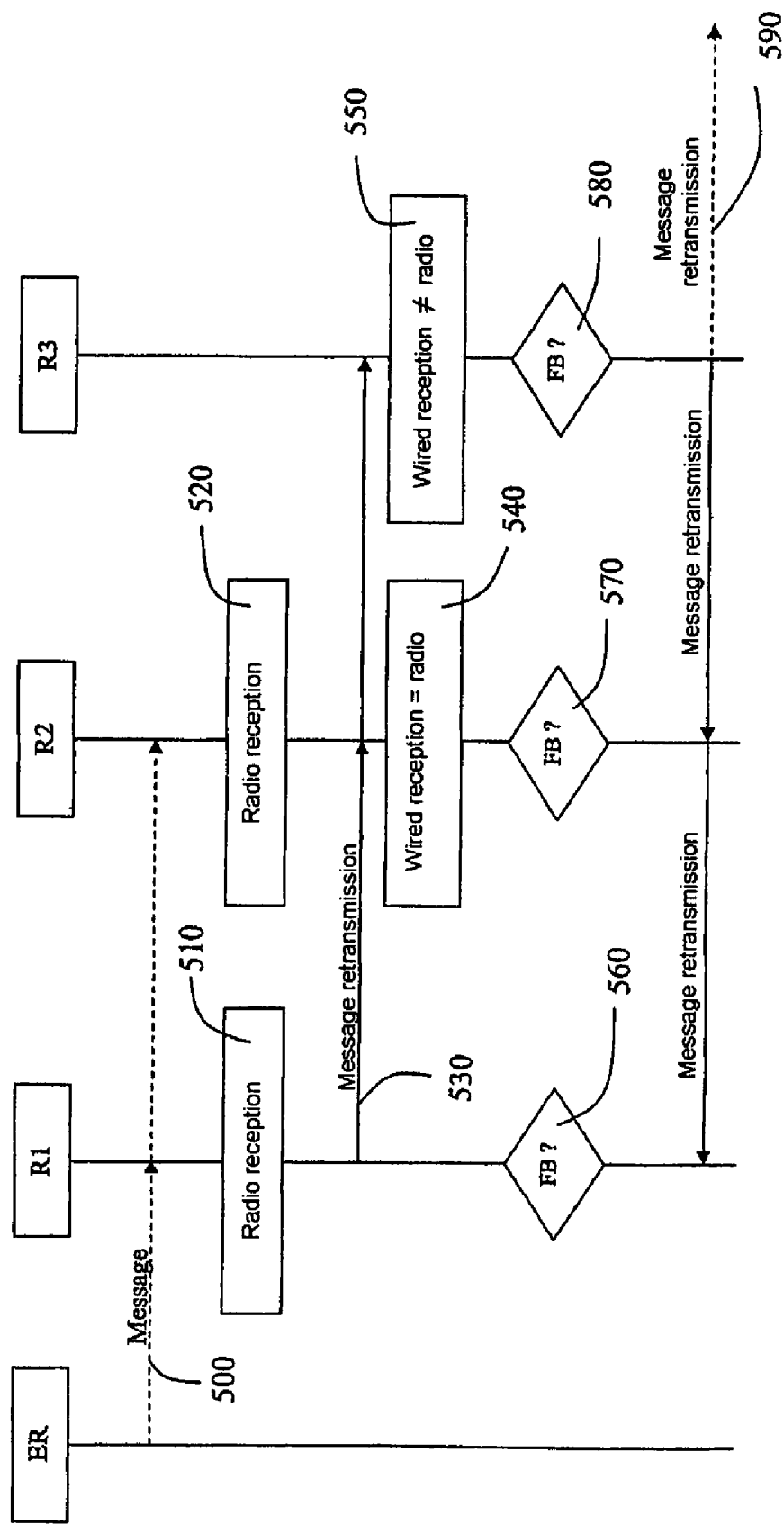

FIGS. 2a to 2c represent exemplary networks for which the flow diagrams in FIGS. 4a to 4c respectively illustrate operation.

In these figures, the point referenced ER represents a non-wired sending node, the point referenced RR represents a non-wired receiving node, the points referenced R1, R2 and R3 represent wired nodes.

FIGS. 4a to 4c respectively represent in flow diagram form the various steps enabling the communication between a sending node and a receiving node in the various cases illustrated in FIGS. 2a to 2c. The transmissions of messages or of confirmation signals by non-wired channel are represented by broken line arrows and the transmissions of messages or confirmation signals by wired channel, by solid line arrows.

FIG. 4a represents in flow diagram form the various steps enabling the communication between the sending node ER and the receiving node in the network represented in FIG. 2a.

In a first step 100, the sending node ER sends a message by non-wired channel. In a step 110, one of the wired nodes R1 and, in a step 120, the receiving node RR, receive this message by non-wired channel.

In a step 130, the wired node R1 receiving the message by non-wired channel transmits this message by wired channel to the wired node R2. Several wired nodes cannot in theory transmit a message simultaneously by wired channel. In practice, these nodes operate on the LBT (Listen Before Transmit) principle—a solution that is well proven and very reliable). Other equivalent solutions could, if necessary, be implemented without influencing the principle of the invention.

In a step 140, the wired node R2 receives the message by wired channel and observes that it did not receive it by non-wired channel. For this observation, the wired node R2 compares the signals that it receives by wired channel and by non-wired channel. As represented in FIG. 3, based on the signal resulting from this comparison, the wired node R2 deduces whether it is or is not within range of the sending node ER. For the retransmission of the message by non-wired channel, if necessary, priority is given to a wired node out of range of the sending node, that is, a wired node having received the message by wired channel but not having received the message by non-wired channel. The comparison between the signals received by non-wired channel and by wired channel can consist in digitally comparing the signals received, possibly with a slight filtering (for example, by intercorrelation) or by comparing the contents of the frames. A distinction is then made, at a given instant of the transmission, between a group of wired nodes out of range of the sending node and a group of nodes within range of the sending node.

In the steps 150 and 160, the wired nodes switch to a listening mode, that is, they listen, during a time slot T1 (5 ms, for example, a normative value), for whether a start of transmission of a possible confirmation message FB in response to the message received by wired channel is sent by non-wired channel.

In a step 170, the receiving node RR sends by non-wired channel a confirmation signal in response to the message that it has received in the step 120.

Since the wired node R1 and the sending node ER are within range of the receiving node RR, they receive the start of transmission of the confirmation signal during the time slot T1 and therefore continue their listening for the message respectively in the steps 180 and 190.

In a step 200, the wired node R1 receiving the confirmation signal retransmits the latter by wired channel to the wired node R2. The step 200 takes place roughly simultaneously with the steps 180 and 190.

In a step 210, the wired node R2 receives the confirmation signal.

In the steps 220, 230, 240 and 250, the different nodes of the network terminate the communication session.

In this case, no other communication by wired channel or non-wired channel is then needed any longer. The non-wired network formed by the non-wired nodes is then self-sufficient in terms of range.

By using the LBT (Listen Before Transmit) principle for the wired network, whereby a node must listen to what is happening on the network before transmitting information, and by applying a similar principle for the non-wired communications received, the risk of duplicating the transmission of one and the same message is obviated. Thus, this principle makes it possible to avoid any duplicated retransmission of one and the same message to a receiving node.

FIG. 4b represents in flow diagram form the various steps enabling the communication between the sending node ER and the receiving node in the network represented in FIG. 2b.

In a first step 300, the sending node ER sends a message by non-wired channel. In a step 310, one of the wired nodes R1 receives this message.

In a step 320, the wired node R1 receiving the message by non-wired channel transmits this message by wired channel to the wired node R2. It will be noted that the steps 300 and 320 are roughly simultaneous.

In a step 330, the wired node R2 receives the message by wired channel and observes that it did not receive it by non-wired channel. For this observation, the wired node R2 compares the signals that it receives by wired channel and by non-wired channel. As represented in FIG. 3, based on the signal resulting from this comparison, the wired node R2 deduces whether it is or is not within range of the sending node ER. For the retransmission of the message by non-wired channel, if necessary, priority is given to a wired node out of range of the sending node, that is, a wired node having received the message by wired channel but not having received the message by non-wired channel.

In the steps 340 and 350, the two wired nodes switch to a listening mode, that is, they listen, during a time slot T1 (5 ms for example), for whether a start of transmission of a possible confirmation message FB in response to the message received by wired channel is sent by non-wired channel.

If the recipient is not within an area within range of the sending node, it does not receive the message and therefore cannot respond to it. For the duration T1, the various wired nodes having received the message by non-wired and/or wired channels listen for any confirmation signal.

Since the wired node R2 does not receive the start of transmission of a confirmation signal during T1, in a step 360 it retransmits, by non-wired channel, the message that it has received by wired channel. It also, in a step 365, retransmits this message over the wired network simultaneously.

In a step 370, the receiving node RR receives this message.

In a step 380, the receiving node RR sends by non-wired channel a confirmation signal in response to the message that it received in the step 370.

Since the wired node R2 is within range of the receiving node RR, it receives the start of the transmission of a confirmation signal and simultaneously retransmits what it receives by wired channel in a step 390.

The confirmation signal is received by the wired node R2 in a step 400 and by the node R1 in a step 410. During a step 420, it is retransmitted in a non-wired way from the wired node R1 to the sending node ER. These steps (400, 410, 420) are roughly simultaneous.

The transmission of the confirmation signal is less critical than the retransmission of the message, since the problems associated with a duplicated transmission are reduced. However, it can be processed in the same way as the transmission of the message (or more simply, following the reverse path having led to the successful transmission of the message).

If the first wired repeater node, which has tried to retransmit the message by non-wired channel, receives no confirmation signal, this signal can be repeated by another non-wired node out of range of the sending node then by a wired node within range of the sending node but other than that originating the wired retransmission, until the confirmation signal is heard and is retransmitted to the sending node. It is possible preferably to choose a wired node out of range of the last wired node (sender of the previous radio signal) to take its turn to speak. In this way, the method according to the invention is repeated to transmit the confirmation signal, that is, to give priority, for the retransmission, to a node out of range of the last sending node. This principle makes it possible to converge rapidly towards the node to be reached.

The priority between the nodes can, for example, be managed by different time slots for the different nodes. Thus, a node having received the message exclusively by wired channel will take its turn to speak earlier than a node having received the message both by wired and by non-wired channels.

This makes it possible to give speech priorities, without excluding the repetition of the message by any wired node of the network.

Each time slot is initialized at the end of the transmission of a message over the wired network.

In the steps 430, 440, 450 and 460, the different nodes of the network terminate the communication session.

FIG. 4c represents in flow diagram form the various steps enabling the communication between the sending node ER and the receiving node in the network represented in FIG. 2c. This figure more visibly illustrates the principle of selection of a node for the retransmission of a message.

The network represented in FIG. 2c comprises three wired nodes, two of which are in the area within range of the sending node ER.

In a first step 500, the sending node ER sends a message by non-wired channel. In the steps 510 and 520, two wired nodes R1 and R2 receive this message.

In a step 530, one of these two wired nodes retransmits the message while it is being received by wired channel.

In a step 540, the wired node R2 receives the message by wired channel and observes that it has already received the message by non-wired channel and, in a step 550, the wired node R3 receives the message by wired channel and observes that it has not received it by non-wired channel. For these observations, the wired nodes R2 and R3 compare the signals that they receive by wired channel and by non-wired channel. As represented in FIG. 3, based on the signal resulting from this comparison, the wired nodes R2 and R3 deduce whether they are or are not within range of the sending node ER. For the retransmission of the message by non-wired channel, if necessary, priority is given to a wired node out of range of the sending node, that is, a wired node having received the message by wired channel but not having received the message by non-wired channel.

In the steps 560, 570 and 580, all the wired nodes then listen for any confirmation signal sent by the receiving node. If no confirmation signal is received, the wired nodes then consider that the receiving node to be reached is located out of range of the sending node and, consequently, probably out of range of the wired nodes R1 and R2 around the sending node, that is, out of range of the wired nodes having received the message from the sending node ER by non-wired channel.

Since the node R1 is the originator of the retransmission by wired channel, it is temporarily ruled out for retransmitting the message by non-wired channel. The wired nodes R2 and R3 having compared the messages that they have received by non-wired channel and by wired channel, in a step 590, the message is retransmitted in a non-wired way by the wired node R3 having received the message only by wired channel.

In a second stage, if the receiving node has not received the message following the retransmission of the message in a non-wired way by R3, priority is given to retransmitting the message by one of the wired nodes within range of the sending node.

If several wired nodes have, like the wired node R3, received the message only by wired channel, the signal is retransmitted by one of these nodes according to the LBT principle, with one of the nodes taking its turn to speak on expiry of the time slot T1, during which each node checks that it has not received a start of transmission of a message receipt confirmation signal. The signal is retransmitted by these various nodes successively as long as no confirmation signal begins in the time slot T1. During this retransmission by wired channel, the message is also repeated over the wired network. A new time slot T1 is initialized on each retransmission of the message over the wired network. The nodes having received the message by wired channel and non-wired channel do not, where appropriate, take their turn to speak until the end of a second time slot T2 slightly greater than the first time slot T1 (T2 for example being 7 ms), if no message has been retransmitted by wired channel during the slot T2. The second time slot T2 is, like the first time slot T1, initialized after each message retransmission over the wired network.

According to the method that is the subject of the invention, it is a wired node out of range of the sending node which, as a priority, will retransmit the message in a non-wired way in order to try to communicate it to the receiving node.

This method is based on the following assumption: if the receiving node is out of range of the sending node, then it must send the message to be transmitted from the sending node to the receiving node via a repeater node also located out of range of the sending node.

It may be that, in certain cases, this assumption is not verified. For example, in some rare cases (case of node D2 in FIG. 1), the receiving node can be out of range of the sending node and the only repeater node making it possible to reach the receiving node may also be within range of the sending node. To handle the operation of the communication method even in these cases, the wired nodes out of range of the sending node, according to the invention, take priority for retransmitting the message to the receiving node. Once the wired nodes out of range of the sending node have successively tried to retransmit the message, the wired nodes within range of the sending node will in turn try to transmit the message to the receiving node.

Alternatively, if the principle of the invention is repeated, a new group of wired nodes out of range of the last sending (wired) node is determined on each new retransmission of the message that is needed. This makes it possible to converge more rapidly towards an effective transmission.

In the case (case of node D1: low probability if the wired network is well arranged) where the node receiving the confirmation signal (that is, the sending node) is within range of the sending node (that is, the receiving node), but not within range of any of the wired nodes, the latter will behave as if the message had not reached its destination. As for the sending node, it will receive the confirmation signal. It may, to avoid unnecessary retransmissions via wired nodes, once again send an end-of-transmission signal that will be recognized by all the repeater nodes.

The wired communication channels can, in particular, consist of electrical conductors intended exclusively for the transmission of data or electrical conductors intended for the transmission of data and energy.

The non-wired communication channels can, in particular, consist of links by radiofrequency waves or links by light beams, for example of infrared type.

The method can be used dynamically; it can also be used to construct routing tables, such that each non-wired node is associated with one of the wired nodes when the latter detects the non-wired node within its area of range.

The invention claimed is:

1. A method of communication in a home automation network ensuring a message is only received once at a non-wired receiving node comprising non-wired nodes provided with communication means enabling communication by non-wired channel and wired nodes provided with communication means enabling communication by wired channel and by non-wired channel, wherein a wired node repeats by non-wired channel a message received exclusively by wired channel if it does not receive a message receipt confirmation signal, the transmission of this message receipt confirmation signal beginning in a first time slot after the receipt of the message by wired channel,
wherein the first time slot is initialized on each retransmission of the message by wired channel by a wired node.

2. The method of communication as claimed in claim 1, wherein a wired node repeats by wired channel a message received exclusively by non-wired channel, systematically and roughly simultaneously with the reception of the message received by non-wired channel.

3. The method of communication as claimed in claim 1, wherein a wired node transmits by wired channel a message sent by non-wired channel, systematically and roughly simultaneously with the transmission of the message by non-wired channel.

4. The method of communication as claimed in claim 1, wherein the message receipt confirmation signal is received by wired channel or by non-wired channel.

5. The method of communication as claimed in claim 1, wherein a wired node having repeated by wired channel a message received exclusively by non-wired channel, retransmits in a non-wired way a message receipt confirmation signal received by wired channel.

6. The method of communication as claimed in claim 1, wherein the message is repeated in a priority manner by the wired nodes having received the message exclusively by wired channel.

7. The method of communication as claimed in claim 6, wherein the repetition priority is managed by a second time slot beginning on the last repetition of the message, this second time slot allocated to the non-priority nodes being greater than the first time slot allocated to the priority nodes.

8. The method of communication as claimed in claim 1, wherein the message is repeated as a priority by a wired node not having received by non-wired channel the latest repetition of the message that has taken place.

9. The method of communication as claimed in claim 8, wherein the repetition priority is managed by a second time slot beginning on the last repetition of the message, this second time slot allocated to the non-priority nodes being greater than the first time slot allocated to the priority nodes.

10. The method of communication as claimed in claim 1, wherein, during a communication session, a wired node repeats, by non-wired channel, one and the same message only once.

11. The method of communication as claimed in claim 1, wherein the different communication links between the different nodes of the network are recorded in order to construct routing tables progressively and dynamically.

12. The method of communication as claimed in claim 11, wherein the wired nodes store an identifier of the non-wired nodes for which they receive a message by non-wired channel.

13. A network comprising non-wired nodes provided with communication means enabling communication by non-wired channel and wired nodes provided with communication means enabling communication by wired channel and by non-wired channel, which comprises hardware means and software means for implementing the method of communication as claimed in claim 1.

14. The network as claimed in claim 13, wherein at least the wired nodes comprise memories for storing in particular communication routing information.

15. The method of communication as claimed in claim 1, wherein each wired node determines whether it received the message exclusively by a wired channel and determines whether it is within range of a sending node by comparing signals received from the wired and non-wired channel.

16. The method of communication as claimed in claim 1, further comprising:
giving priority for the retransmission of the message by a wired node from among the wired nodes based on the wired node receiving the message by the wired channel without receiving the message by the non-wired channel.

* * * * *